United States Patent
Grant-Acquah et al.

(10) Patent No.: US 6,237,919 B1
(45) Date of Patent: May 29, 2001

(54) HIGH LOAD BEARING UV COATING FOR CYLINDER HEAD GASKETS AND HEAD GASKET INCORPORATING THE SAME

(75) Inventors: Frank C. Grant-Acquah, Hanover Park; Kanu G. Shah, Arlington Hts.; Brent Boldt, Bartlett, all of IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/281,918

(22) Filed: Mar. 31, 1999

(51) Int. Cl.[7] ........................................ F02F 11/00
(52) U.S. Cl. ................................ 277/592; 277/600
(58) Field of Search ........................... 277/600, 592

(56) References Cited

U.S. PATENT DOCUMENTS

| | | | | |
|---|---|---|---|---|
| 1,974,633 | * | 9/1934 | Victor | 277/600 |
| 3,762,940 | * | 10/1973 | Bechtold | 117/76 F |
| 3,970,322 | * | 7/1976 | Stecher et al. | 277/592 |
| 4,284,282 | * | 8/1981 | Lonne | 277/600 |
| 4,659,410 | * | 4/1987 | McDowell et al. | 156/277 |
| 4,822,062 | * | 4/1989 | Gallo et al. | 277/592 |
| 5,312,943 | * | 5/1994 | Gaglani | 556/414 |
| 5,352,712 | * | 10/1994 | Shustack | 522/31 |
| 5,374,069 | * | 12/1994 | Pecina | 277/592 |
| 5,426,132 | * | 6/1995 | Gaglani | 522/148 |
| 5,468,003 | * | 11/1995 | Staab et al. | 277/592 |
| 5,523,443 | * | 6/1996 | Gaglani | 556/421 |
| 5,576,356 | * | 11/1996 | Leir et al. | 522/31 |
| 5,616,403 | | 4/1997 | Eckberg et al. | 428/215 |
| 5,753,318 | | 5/1998 | Eckberg et al. | 427/512 |
| 5,753,346 | * | 5/1998 | Leir et al. | 428/145 |
| 5,984,317 | * | 11/1999 | Grant-Acquah et al. | 277/592 |
| 6,040,353 | * | 3/2000 | Glover et al. | 522/15 |

\* cited by examiner

*Primary Examiner*—Anthony Knight
*Assistant Examiner*—Alison K. Pickard
(74) *Attorney, Agent, or Firm*—Rader, Fishman & Grauer PLLC

(57) ABSTRACT

A coating for a cylinder head gasket, which contains a modified silicone system having a vinyl ether incorporated therein. The modified silicone system is preferably UV-curable, the preferred vinyl ether in the silicone system is cyclohexanedimethanol divinyl ether, and the coating consists completely of reactive components prior to curing.

14 Claims, 1 Drawing Sheet

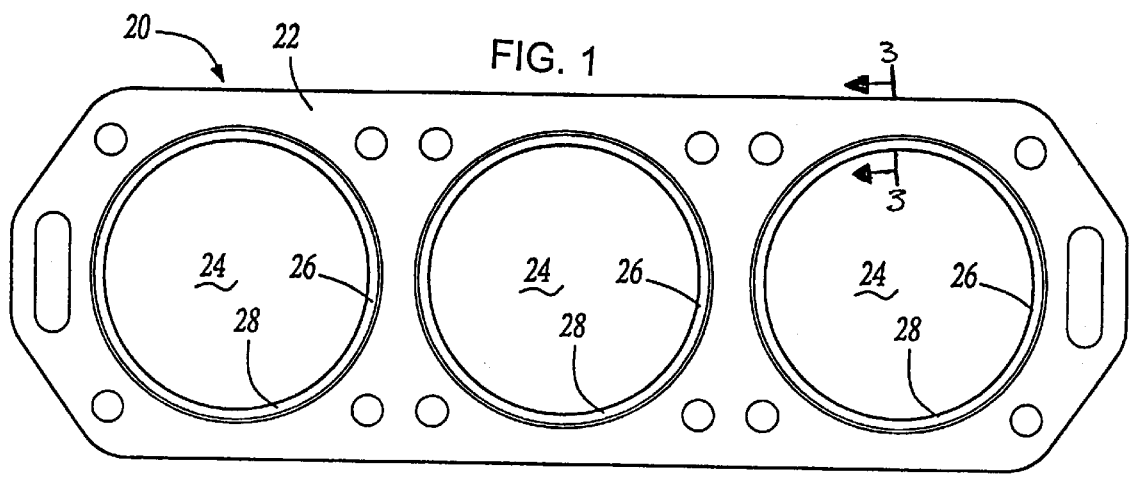
FIG. 1
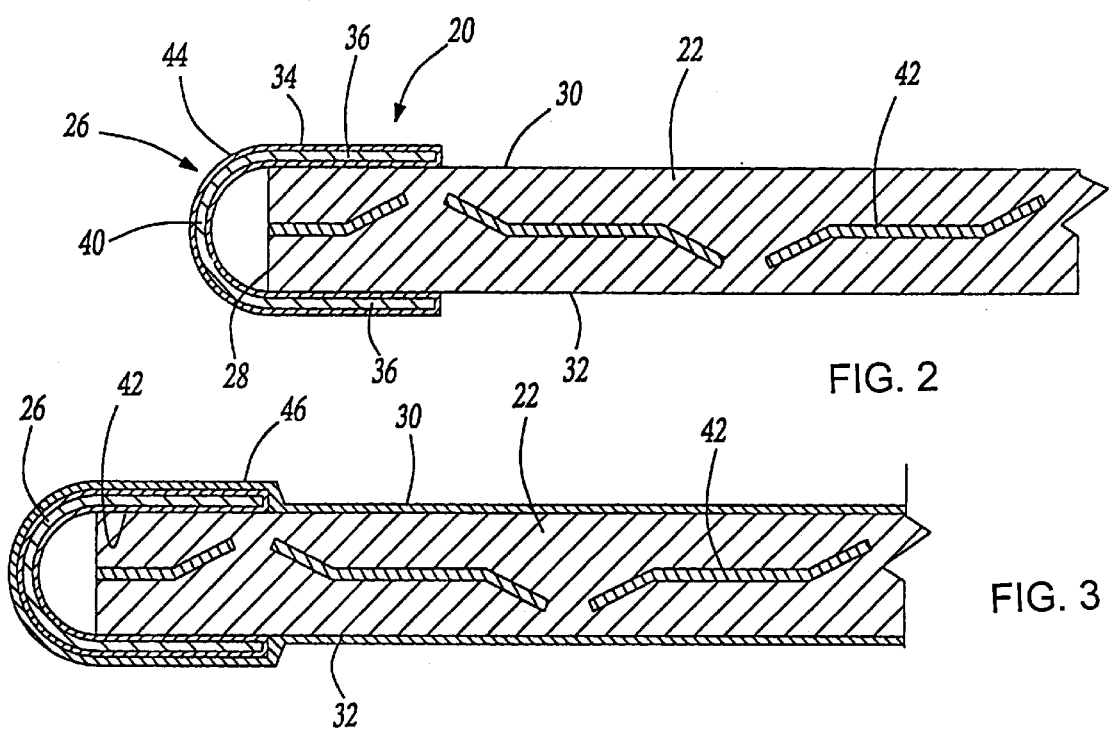
FIG. 2
FIG. 3

HIGH LOAD BEARING UV COATING FOR CYLINDER HEAD GASKETS AND HEAD GASKET INCORPORATING THE SAME

FIELD OF THE INVENTION

The present invention relates generally to the an engine cylinder head gasket having a high load bearing UV coating. More particularly, the invention relates to a coating for use on a cylinder head gasket.

BACKGROUND OF THE INVENTION

Gaskets are often used as a seal between mating mechanical components. One common application involves gasket placement between the engine block and cylinder head of an internal combustion engine. The engine block and cylinder head are bolted together and the gasket relies on the force of the bolted connection to seal the various openings between the two mating components. In particular, cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing.

It is typical for a cylinder head gasket to include a main gasket body with a cylinder bore opening, the periphery of which is surrounded by a metallic generally U-shaped flange. The flange engages both the upper face and the lower face of the main gasket body. The flange provides improved protection to the gasket body from the high temperature gases of combustion and serves to dissipate the heat of combustion into the gasket body and away from the cylinder bore opening.

Load bearing coatings have been incorporated onto surfaces of the cylinder head gasket to provide static sealing of joints such as those for which cylinder head gaskets are used. These coatings often contain silicone and normally contain solvents, and require heat to cure. In such a case, the increased sealing property of the silicone is attained at the expense of a decreased load bearing property. Furthermore, the weakness of the coating results in the inability of the gasket to maintain its mechanical structure once the pressure of a load is removed from the gasket. As a result, the gasket must often be replaced when the pressure of a load is removed from the gasket during maintenance or repair of an engine using the gasket.

Accordingly, it is desirable to provide a coating having a high sealing property, increased strength and durability, a high cross-link density when cured, and a good release property. It is also desirable that the coating be readily available for use after long periods of storage. It is further desirable to provide a cylinder head gasket that has a high load bearing characteristic at both high and low temperatures, and adequately seals the joints to which the gasket is mated.

SUMMARY OF THE INVENTION

A cylinder head gasket according to the present invention includes a main gasket body having a multi-faced surface, and a coating about the surface, where the coating contains a silicone system having a vinyl ether incorporated therein. The gasket may also include a fluid flow opening defined by a periphery of the main gasket body, and a metallic generally U-shaped flange with an outer surface, where the flange has opposing legs separated by a central section that is disposed within the fluid flow opening. The upper leg engages the upper face and the lower leg engages the lower face with the central section extending radially into the opening away from the periphery. When the flange is incorporated with the gasket, the coating covers the outer surface of the U-shaped flange. In a preferred embodiment of the invention, the coating entirely covers both the surface of the main gasket body and the outer surface of the U-shaped flange.

The coating is preferably an ultraviolet ("UV") curable coating. Furthermore the vinyl ether incorporated in the silicone system is preferably cyclohexanedimethanol divinyl ether. When cured, the coating has an effective thickness of at least 0.0002 inches (0.0051 mm). In a preferred embodiment, the thickness after curing is in a range of up to 0.0015 inches (0.0381 mm). However, the range can be extended to a higher upper limit when the surface of the head gasket is rough or when a component that mates with the gasket is rough.

The present invention also includes a method of coating a substrate of a load bearing component of an engine, which comprises the steps of combining a silicone copolymer, a vinyl ether compound, a photoinitiator, and a UV-curable polymer to form the coating; applying the coating to the substrate; and curing the coating at an ambient temperature.

The applying step may include performing a coating application such as a curtain application, a silk screen application, or reverse roll coating. The curing step includes exposing the coated substrate to UV radiation. As mentioned above, the vinyl ether is preferably cyclohexanedimethanol divinyl ether. The photoinitiator, is preferably in a range from about 2 to about 4 parts by weight, the UV-curable polymer is preferably in a range from about 40 to about 80 parts by weight, the silicone copolymer is preferably in a range from about 10 to about 50 parts by weight, and the vinyl ether is preferably in a range from greater than zero to about fifteen parts by weight.

One advantage of the coating of the present invention is that it consists completely of reactive components prior to curing. Accordingly, no solvents need be present in the coating prior to curing, and heat need not be applied to cure the coating. The inventive coating has high sealing characteristics and a high cross-link density when cured. Moreover, the coating has a high load bearing characteristic at both ambient and elevated engine operational temperatures. Furthermore, the coating has a very good release property following continuous and heavy load subjection on a substrate to which the coating is applied. Finally, the coating has excellent pot life, resulting in the ability to be stored in an uncured state for long periods of time prior to use.

BRIEF DESCRIPTION OF THE DRAWINGS

The features and inventive aspects of the present invention will become more apparent upon reading the following detailed description, claims, and drawings, of which the following is a brief description:

FIG. 1 is a planar view of a cylinder head gasket according to the present invention.

FIG. 2 is a partial cross-sectional view of the gasket showing an optional plating layer which was applied to the flange before it was formed into its operational shape.

FIG. 3 is a partial cross-sectional view of the gasket along lines 3—3 in FIG. 1 showing the gasket after the final coating has been applied to the flange and to at least a portion of the main gasket body.

DETAILED DESCRIPTION OF A PREFERRED EMBODIMENT

A cylinder head gasket 20 according to the present invention is illustrated in FIG. 1. The gasket 20 has a main body 22, and a plurality of fluid flow openings, the openings including combustion bore openings 24. A generally U-shaped flange 26 may be received within one of the openings 24 and disposed about an inner periphery 28. The gasket 20 is normally used as a seal between an engine block and cylinder head of an internal combustion engine (not shown). The engine block and cylinder head are bolted together. The gasket 20 relies on the force of the bolted connection to seal the various openings between the two mating components. It is within the purview of the invention that its principles can be used for other gaskets or engine components, particularly those that are subject to high load bearing conditions.

The relationship between flange 26 and main body 22 is best illustrated in FIG. 2. The main body 22 includes an upper face 30 and a lower face 32. The U-shaped flange 26 has an outer surface 34 and opposing legs 36, 38 separated by a central section 40. Leg 36 engages the face 30 and leg 38 engages the lower face 32. The central section 40 is generally arcuate and extends radially inwardly into the opening 24 away from the periphery 28. The flange 26 provides improved protection to the main body 22 from the high temperature gases of combustion and serves to dissipate the heat of combustion into the main body 22 and away from the cylinder bore opening 24.

As shown in FIG. 2, the outer surface 40 of the flange 26 may have an optional plating layer 44. An example plating layer 44 would be one that comprises predominantly nickel, particularly when main body 22 is formed from graphite. The optional plating layer 44 protects the inside of flange 26 from corrosive elements found in graphite such as chlorine and sulfur.

As shown in FIG. 3, the gasket 20 includes an outer coating 46 disposed about the outer surface 40 of the flange 26. In one embodiment of the invention, the outer coating 46 covers the flange 26, and perhaps a portion of the main body 22 of the gasket 20. In another embodiment of the invention, the outer coating 46 covers all of the exposed surfaces of both the flange 26 and the main body 22. The coating 46 includes the incorporation of vinyl ether into a modified silicone ultraviolet ("UV") curable system. In a preferred embodiment, the vinyl ether incorporated into the silicone UV curable system is cyclohexanedimethanol divinyl ether.

In a preferred embodiment of the invention, the silicone compound is a silicone copolymer, present in a range from about 10 to about 50 parts by weight, and the vinyl ether is present in a range from greater than zero to about fifteen parts by weight. In such a case, the coating also includes a photoinitator, in a range from about 2 to about 4 parts by weight, and a UV-curable polymer, in a range from about 40 to about 80 parts by weight.

Preferably, the main body 22 is formed as a composite having improved thermal conductivity when compared to a solely metallic component. For example, the main body 22 may be formed from graphite. A plurality of optional metallic tangs 42 may also be disposed within the main body 22. Furthermore, the coating 46 may also be adhered to paper substrates or plastic substrates about a metal composite material, graphite, or perforated steel core, for example.

Preparation and application of the coating of the preferred embodiment of the present invention includes the steps of combining a silicone copolymer, a vinyl ether compound, a photoinitiator, and a UV-curable polymer; applying the coating to a substrate; and curing the coating at an ambient temperature by exposing the coated substrate to UV radiation. The application of the coating to the substrate may be performed using a coating application such as a curtain application, a silk screen application, or reverse roll coating.

According to the method of the present invention, the photoinitiator is preferably in a range from about 2 to about 4 parts by weight, the UV-curable polymer is preferably in a range from about 40 to about 80 parts by weight, the silicone copolymer is preferably in a range from about 10 to about 50 parts by weight, and the vinyl ether is preferably in a range from greater than zero to about fifteen parts by weight. Pigment may also be added to the mixture at up to about 10 parts by weight while still adhering to the principles of the invention.

As an example of the preferred embodiment of the invention, divinyl ether of 1,4 cyclohexanedimethanol and a silicone copolymer containing a polydimethylsiloxane chain with epoxy functionality were mixed, together with a photoactive iodonium salt solution, and a solventless UV curable polymer. More particularly, 10 parts by weight of the divinyl ether of 1,4 cyclohexanedimethanol, 2.6 parts by weight of the photoactive iodonium salt solution, 56.8 parts by weight of UV9425™, produced by GE Silicones™, as the solventless UV curable polymer, and 30.6 parts by weight of UV9300™, produced by GE Silicones™, as the silicone copolymer, were mixed together. Once homogenously mixed, the coating was applied to the surfaces of a head cylinder gasket of an internal combustion engine using reverse roll coating. The coated gaskets were then placed on a conveyor which transported the coated gaskets through a UV curing chamber at about 20 feet per minute, thereby exposing the coated gaskets to UV radiation for about 2 seconds.

When the coating 46 is prepared, the compounds present in the mixture are all reactive reagents, with no required solvents. Because no solvents are present in the system, heat is not necessary to cure the coating. As a result, the load bearing characteristics of the cured coating are increased, as heat during curing tends to decrease the system's load bearing properties. The UV curable system provides the advantage of faster curing (seconds instead of minutes) relative to heat cured silicone systems. Because the modified silicone system of the present invention incorporates a vinyl ether, and does not require heat for curing, the strength, durability, and cross-linking density of the cured system are greatly improved over systems without a vinyl ether incorporated therein, as well as those requiring heat to cure the coating.

Experimental results have also shown that the system of the present invention has marked improvement in load bearing characteristics both at ambient temperatures and at elevated engine operational temperatures. Where cyclohexanedimethanol divinyl ether was incorporated into the modified silicone UV curable system and applied to the surface of a cylinder head gasket 20 according to the principles of the present invention, a 90% improvement resulted from hot compression tests at 300° C. compared to the type of coating that does not incorporate a vinyl ether. Tests were also performed comparing compressibility and recovery of a gasket with the cured coating at 5000 psi, the sealability (cc/min leakage) of the gasket using the coating under an internal nitrogen pressure of 60 psi with stress forces of 500 psi and 1000 psi, the percentage of creep relaxation at high temperatures, and the adhesion of the coating after subjection to common engine fluid immersions for 70 hours at various temperatures. In every case where cyclohexanedimethanol divinyl ether was incorporated into the modified silicone UV curable system the results were approximately equal to, or better than the results using a coating that did not incorporate a vinyl ether.

Preferably, the coating 46 has a cured film thickness greater than about 0.0002 inches (0.0051 mm). An effective upper range for the thickness of the cured film is 0.0015 inches (0.381 mm). However, the upper range can be higher when the surface to which the cured film adheres is especially rough or otherwise requires a thicker film for complete coverage and protection.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A cylinder head gasket including a main gasket body having a lower surface and an upper surface, the improvement comprising:

a coating about said upper and lower surfaces, said coating comprising a silicone compound and a vinyl ether compound.

2. A cylinder head gasket according to claim 1, wherein said main gasket body further includes a fluid flow opening defined by a periphery of said main gasket body, and a metallic generally U-shaped flange with an outer surface, said flange having opposing legs separated by a central section disposed within said fluid flow opening, an upper leg engaging said upper face and a lower leg engaging said lower face with said central section extending radially into said opening away from said periphery, wherein said coating about said upper and lower surfaces covers said outer surface of said U-shaped flange.

3. A cylinder head gasket according to claim 2, wherein said coating entirely covers said surface of said main gasket body and entirely covers said outer surface of said U-shaped flange.

4. A cylinder head gasket as recited in claim 1, wherein said coating is a UV-curable coating.

5. A cylinder head gasket as recited in claim 4, wherein said vinyl ether is cyclohexanedimethanol divinyl ether.

6. A clinder head gasket as recited in claim 4, wherein said coating further comprises:

a photoinitator, in a range from about 2 to about 4 parts by weight; and a UV-curable polymer, in a range from about 40 to about 80 parts by weight, wherein said silicone compound is a silicone copolymer, present in a range from about 10 to about 50 parts by weight, and said vinyl ether is present in a range from greater than zero to about fifteen parts by weight.

7. A cylinder head gasket according to claim 4, wherein said coating consists of only reactive components prior to curing.

8. A cylinder head gasket according to claim 4, wherein no solvents are present in said coating prior to curing.

9. A cylinder head gasket as recited in claim 1, wherein said coating has a cured film thickness between at least about 0.0002 inches and about 0.015 inches.

10. A method of coating a cylinder head gasket, which comprises the steps of:

a) applying a coating to said gasket, said coating comprising
       i) a silicone copolymer, and
       ii) a vinyl ether compound; and
    b) curing said coating at an ambient temperature.

11. A method as set forth in claim 10, wherein said vinyl ether is cyclohexanedimethanol divinyl ether.

12. A method as set forth in claim 10, wherein said coating further comprises a photoinitiator, in a range from about 2 to about 4 parts by weight, and a UV-curable polymer in a range from about 40 to about 80 parts by weight, and wherein said silicone copolymer is in a range from about 10 to about 50 parts by weight, and said vinyl ether is in a range from greater than zero to about fifteen parts by weight.

13. A method as set forth in claim 10, wherein said curing in step b) comprises exposing said cylinder head gasket to UV radiation.

14. A method as set forth in claim 10, wherein said applying in step a) comprises performing a coating application selected from curtain application, silk screen application, and reverse roll coating.

* * * * *